US006419853B1

(12) United States Patent
Matsumoto

(10) Patent No.: US 6,419,853 B1
(45) Date of Patent: Jul. 16, 2002

(54) METHOD OF PREPARING A RARE EARTH ACTIVATED, ALKALINE EARTH METAL FLUOROHALIDE BASED PHOSPHOR

(75) Inventor: Hiroshi Matsumoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 21 days.

(21) Appl. No.: 09/634,295

(22) Filed: Aug. 9, 2000

(30) Foreign Application Priority Data

Aug. 18, 1999 (JP) ............................................ 11-231175

(51) Int. Cl.⁷ ................................................ C09K 11/08
(52) U.S. Cl. ................................................ 252/301.4 H
(58) Field of Search ................................... 252/301.4 H

(56) References Cited

U.S. PATENT DOCUMENTS 4,239,968 A    12/1980   Kotera et al. ......... 252/301.4 H
4,547,672 A    10/1985   Arakawa et al. ......... 250/443.1

FOREIGN PATENT DOCUMENTS

JP    55-012145    1/1980
JP    A7233369    9/1995

*Primary Examiner*—C. Melissa Koslow
(74) *Attorney, Agent, or Firm*—Birch, Stewart, Kolasch & Birch, LLP

(57) ABSTRACT

A method of preparing a rare earth activated, alkaline earth metal fluorohalide based phosphor comprising the steps of: (a) providing a phosphor material, which includes BaFBr particles, and a phosphor material, which includes BaFI particles, wherein the average particle diameter of the BaFI particles is no more than four times the average particle diameter of the BaFBr particles; (b) mixing the phosphor materials together to thereby obtain a mixture of the phosphor materials; and (c) calcining the mixture of phosphor materials.

21 Claims, No Drawings

METHOD OF PREPARING A RARE EARTH ACTIVATED, ALKALINE EARTH METAL FLUOROHALIDE BASED PHOSPHOR

BACKGROUND OF THE INVENTION

1. Field of the Invention

The present invention relates to a method of preparing a rare earth activated, alkaline earth metal fluorohalide based phosphor which can be used for a radiation image conversion panel which is favorably used in the medical field and the like.

2. Description of the Related Art

As a method used in place of a conventional radiography, there has been known a radiation image recording and reproducing method which uses a stimulable phosphor as disclosed, for example, in Japanese Patent Application Laid-Open (JP-A) No. 55-12145. This method uses a radiation image conversion panel containing a stimulable phosphor (i.e., accumulative phosphor sheet). In this method, a stimulable phosphor of a radiation image conversion panel absorbs radiation transmitted through a subject or emitted from an object to be examined. Thereafter, the stimulable phosphor is excited over time by an electromagnetic wave (excitation light) such as a visible ray or an infrared ray to thereby allow the radiation energy stored in the stimulable phosphor to be released as fluorescence (stimulated emission). An electric signal is obtained by photoelectrically reading the fluorescence, and the radiation image of the subject or the object to be examined is produced as a visible image on the basis of the obtained electrical signal. After the image remaining on the image conversion panel whose reading has been completed is erased, the radiation image conversion panel is ready for the next photographing. Namely, the radiation image conversion panel can be repeatedly used.

In accordance with the radiation image conversion recording and reproducing method, as compared with a case of using radiography in which a combination of a conventional radiographic film and an intensifying screen is used, there is an advantage in that it is possible to obtain a radiation image having a large amount of information with a much less exposure (radiation) dose. Further, in the conventional radiography, the radiographic film is used up each time photographing is carried out. In contrast, in the radiation image conversion method, since the radiation image conversion panel can be repeatedly used, it is beneficial from the viewpoints of conservation of resources and economic efficiency.

The stimulable phosphor generates stimulated emission when irradiated with excitation light subsequent to irradiation with radiation. In practice, generally used is a phosphor which generates stimulated emission in a wavelength range of 300 to 500 nm by an excitation light in a wavelength range of 400 to 900 nm being irradiated thereon. An example of the stimulable phosphor which has been conventionally used in the radiation image conversion panel is a rare earth activated, alkaline earth metal fluorohalide based phosphor. A radiation image conversion panel used in the radiation image recording and reproducing method is formed by, as a fundamental structure, a support and a stimulable phosphor layer which is provided on a surface of the support. However, the support is not necessarily needed if the stimulable phosphor layer is a self-supporting layer. The stimulable phosphor layer is generally formed by a stimulable phosphor and a binder which contains and supports the stimulable phosphor in a dispersed state. However, there has been known a stimulable phosphor layer which does not contain a binder and is composed solely of a stimulable phosphor in a state of an aggregate formed by vapor deposition or sintering thereof. Further, there has also been known a radiation image conversion panel which has a stimulable phosphor layer in which a polymeric substance is impregnated into the gaps in the aggregate of a stimulated phosphor. Whichever type of the stimulable phosphor layers is selected, the stimulable phosphor has a property of emitting a stimulated emission when the phosphor absorbs radiation such as X-rays and is then irradiated with excitation light. Therefore, the radiation transmitted through the subject or emitted from the object to be examined is absorbed in the stimulable phosphor layer of the radiation image conversion panel in proportion to the radiation dose (amount of emitted or transmitted radiation). A radiation image of the subject or the object to be examined is formed on the panel as an image in which radiation energy is stored. The image in which radiation energy is stored can be emitted as stimulated emission by irradiating excitation light thereon, and the image in which radiation energy is stored can be imaged by photoelectrically reading the stimulated emission and converting it into an electric signal.

The surface of the stimulable phosphor layer (i.e., the surface of the layer not facing the support) generally has a protective layer which is formed of a polymer film or a vapor-deposited film of an inorganic substance to thereby protect the stimulable phosphor layer from chemical deterioration or physical impact.

In practical use, the rare earth activated, alkaline earth metal fluorohalide based stimulable phosphor is an excellent stimulable phosphor because it has an excellent sensitivity and provides a radiographic reproduction image having a high level of sharpness when used for a radiation image conversion panel.

However, as the practical use of the radiation image recording and reproducing method has advanced, there has been a growing demand for a stimulable phosphor which has a higher stimulated emission luminance (i.e., higher sensitivity, higher sharpness, and the like).

An observation has been carried out, by using a scanning electron microscope (SEM), on the surface of a calcined product (unclassified) of the conventionally used rare earth activated, alkaline earth metal fluorohalide based phosphor (i.e., rare earth activated, alkaline earth metal fluorohalide based phosphor which is obtained by mixing at least particles of BaFBr phosphor material (hereinafter occasionally referred to as "BFB") and particles of BaFI phosphor material (hereinafter occasionally referred to as "BFI") and calcining the resulting mixture). As a result, it has been observed that BFB particles having small particle diameters are sintered around BFI particles having large particle diameters, thereby forming a number of large over-sintered particles. Formation of such over-sintered particles causes a problem in that the stimulated emission luminance decreases. Further, when a large number of these over-sintered particles are formed, another problem arises in that the yield of the resulting phosphor also decreases. Accordingly, the demand for a stimulable phosphor having a higher stimulated emission luminance can be satisfied by overcoming these problems.

SUMMARY OF THE INVENTION

The present invention accomplished the following objects by overcoming the conventional problems and satisfying the above-mentioned demand. Namely, an object of the present invention is to provide a method of preparing a rare earth activated, alkaline earth metal fluorohalide based stimulable phosphor by which a high yield of a rare earth activated, alkaline earth metal fluorohalide based stimulable phosphor having a high stimulated emission luminance can be obtained.

Means for overcoming the aforementioned problems is as follows.

There is provided a method of preparing a rare earth activated, alkaline earth metal fluorohalide based phosphor comprising the steps of: (a) providing a phosphor material, which includes BaFBr particles, and a phosphor material, which includes BaFI particles, wherein the average particle diameter of the BaFI particles is no more than four times the average particle diameter of the BaFBr particles; (b) mixing the phosphor materials together to thereby obtain a mixture of the phosphor materials; and (c) calcining the mixture of phosphor materials.

DESCRIPTION OF THE PREFERRED EMBODIMENTS

Hereinafter, the present invention will be described in detail.

The phosphor preparation method of the present invention includes a step of mixing phosphor materials, a calcining step, and other steps if necessary.

[Step of Mixing Phosphor Materials]

This mixing step is a step in which at least particles of BaFBr phosphor material, particles of BaFI phosphor material, and other additive components, if necessary, are mixed to obtain a mixture of the phosphor materials.

Phosphor Materials

For the following reasons, the average particle diameter (Dm) of the BaFI particles is no more than four times, and preferably no more than two times, the average particle diameter (Dm) of the BaFBr particles.

The melting point of BaFI is lower than that of BaFBr. Therefore, when these particles are sintered, it is likely that BaFI is a core of a sintered product. Thus, if the average particle diameter (Dm) of the BaFI particles is more than four times the average particle diameter (Dm) of the BaFBr particles, as described above, BFB particles having small particle diameters are sintered around BFI particles having large particle diameters, and as a result, a number of large over-sintered particles are formed. If these over-sintered particles are formed in a large amount, the stimulated emission luminance of the resulting phosphor decreases. Further, since the particle diameter of over-sintered particles is considerably large, there is a remarkable decrease in the particle diameter of the particles when the over-sintered particles are removed in an aggregate-dispersing and classifying process. Furthermore, since a large number of over-sintered particles are formed, the yield of the phosphor obtained after the classifying process decreases.

On the other hand, if the average particle diameter (Dm) of the BaFI particles is no more than four times the average particle diameter (Dm) of the BaFBr particles, large over-sintered particles are not formed. Accordingly, a high yield of a phosphor having a high stimulated emission luminance can be obtained.

The average particle diameter (Dm) of the BaFBr particles is preferably 0.1 to 10 $\mu$m, and more preferably 1 to 8 $\mu$m.

When the above average particle diameter (Dm) is less than 0.1 $\mu$m, the degree of sintering in the calcining step may unpreferably be high. When the above average particle diameter exceeds 10 $\mu$m, image quality of a radiation image conversion panel may deteriorate.

Preferably at least 70% by weight, and more preferably at least 80% by weight of the BaFBr particles are crystals each having a tetradecahedral structure.

When the proportion of the tetradecahedron-structured crystals in the BaFBr particles is less than 70% by weight, image quality of the radiation image conversion panel may deteriorate.

Preferably at most 50% by weight, and more preferably at most 40% by weight of the BaFI particles are crystals each having a tetradecahedral structure.

When the proportion of the tetradecahedron-structured crystals in the BaFI particles exceeds 50% by weight, over-sintering suppressing effect may deteriorate.

A mixing ratio of the BaFBr particles to the BaFI particles (i.e., mole ratio of BaFBr/BaFI) is preferably 50/50 to 95/5.

When this mixing ratio (i.e., mole ratio of BaFBr/BaFI) is less than 50/50, moisture resistance deteriorates. Further, a radiation conversion panel having a mixing ratio of less than 50/50 discolors (turns yellow) easily, and therefore, image quality may deteriorate. On the other hand, when the mixing ratio exceeds 95/5, crystal mixing of Br and I is difficult, and light emission characteristics may deteriorate.

Other Additive Components

Examples other additives include activators containing an activating element such as Eu or Ce, additives containing an alkaline earth metal element such as Sr, Ca or Mg, additives containing an alkali metal element such as Li, Na, K, Rb or Cs, and the like.

These additives may be mixed in advance with the BaFI particles and/or the BaFBr particles before a main mixing step is carried out. Alternatively, the additives may be mixed with the BaFI particles and/or the BaFBr particles in the main mixing step. However, the additives need to be mixed with the BaFI particles and/or the BaFBr particles before the calcining step, which will be described later, is carried out.

The additives are preferably added as halides of the aforementioned respective elements.

A compounding ratio of the above additives and the phosphor materials (i.e., the BaFI particles and the BaFBr particles) varies in accordance with types of the additives. For example, in case of an activator containing Eu or Ce element, the compounding ratio (mole ratio of the additive/ the phosphor materials) is preferably 0/10 to 2/10. Further, in case of an additive containing an alkaline earth metal element, the compounding ratio (mole ratio of the additive/ the phosphor materials) is preferably 0/10 to 5/10. Furthermore, in case of an additive containing an alkali metal element, the compounding ratio (mole ratio of the additive/the phosphor materials) is preferably 0/10 to 0.5/10.

Examples of other additive components other than the aforementioned activators and additives include: metal oxides such as $Al_2O_3$, $SiO_2$ and $ZrO_2$; B disclosed in JP-A No. 57-23673, which can be added at the time of preparing the phosphor to be obtained, for the purpose of improving stimulated luminance, erasability, and the like; As disclosed in JP-A No. 57-23675; a tetrafluoroboric acid compound disclosed in JP-A No. 59-27980; a hexafluoro compound disclosed in JP-A No. 59-47289; V disclosed in JP-A No. 59-56480; transition metals such as Cr, Mn, Fe, Co and Ni; and $BeX"_2$ disclosed in JP-A No. 59-75200 (wherein X" represents at least one halogen atom selected from the group consisting of F, Cl, Br and I).

These additive components are added and mixed at the time of mixing the phosphor materials or before the calcining step which will be described later.

Mixing

In the mixing (i.e., mixing of the phosphor materials), the phosphor materials and the like are mixed at the above-described compounding ratio to obtain a mixture of the phosphor materials.

The mixing method can be appropriately selected from well known mixing methods and carried out. For example, a mixture of the phosphor materials may be prepared by any one of the following methods (i) to (iii):

(i) a method in which the phosphor materials are measured and simply mixed;

(ii) a method in which the phosphor materials are mixed and the resulting mixture is heated at a temperature of 100° C. or more for several or a plurality of hours; and (iii) a method in which the phosphor materials are mixed in a state of a suspension.

A mixing device used for the mixing can be appropriately selected from well known mixing devices and used. Examples of the mixing device include various mixers, a V-type blender, a ball mill, a rod mill, and the like.

In the step of mixing the phosphor materials, the phosphor materials are suitably mixed in the above-described manner to obtain a mixture of the phosphor materials.

[Calcining Step]

The obtained mixture of the phosphor materials is calcined in a calcining step.

The mixture of the phosphor materials is packed into a heat resistant container such as a quartz boat, an alumina crucible, a quartz crucible, or a furnace core tube, and is placed and calcined in a reactor core of an electric furnace.

The calcining temperature is preferably 600 to 1000° C., and more preferably 700 to 850° C.

When the calcining temperature is less than 600° C., diffusion of activator elements in the host crystal and generation of an $F^+$-center which serves as the center of stimulation may not be sufficient. When the calcining temperature exceeds 1000° C., on the other hand, the host crystal may melt.

The calcining time varies depending on the amount of the mixture of the phosphor materials packed, the calcining temperature, the temperature at which the mixture is taken out from a furnace, and the like. However, in general, the calcining time is preferably 0.5 to 10 hours, and more preferably 1 to 6 hours.

When the calcining time is less than 0.5 hour, diffusion of activator elements in the host crystal and permanent generation of an $F^+$-center which serves as the center of stimulation may not be sufficient. On the other hand, even if the calcination is carried out for more than 10 hours, there is little change in the characteristics of the phosphor, and productivity may deteriorate.

The atmosphere in the furnace core tube at the time of the calcination is preferably a neutral or slightly oxidizing gas atmosphere.

An example of the neutral gas atmosphere is an inert gas such as He, Ne, Ar, $N_2$, or the like.

The slightly oxidizing gas atmosphere refers to a weakly oxidizing atmosphere containing 100 to 100000 ppm, preferably 150 to 500000 ppm of oxygen per unit volume of neutral gas. An example of the slightly oxidizing gas atmosphere is a weakly oxidizing gas atmosphere containing oxygen at the above-described concentration in an inert gas such as He, Ne, Ar, $N_2$, or the like.

The amount of oxygen introduced is preferably 0.1 to 200 ml, and more preferably 1 to 100 ml at the calcining temperature per 1 L of the capacity of the calcining region in the furnace. When the amount of oxygen introduced is less than 0.1 ml, effects of improvement in erasability of the stimulable phosphor may not be sufficient. When the amount of oxygen introduced exceeds 200 ml, on the other hand, an amount of stimulated emission may remarkably deteriorate.

Methods of introducing oxygen into neutral gas are not particularly limited and can be appropriately selected from well known introducing methods. However, preferable among well known methods is a method in which, after the interior of the furnace core tube is once bought to a near vacuum state due to air being removed therefrom, a predetermined amount of oxygen is introduced into the furnace core tube, and calcination is carried out in the furnace in a weakly oxidizing atmosphere. In this way, the required amount of oxygen can be accurately introduced into the furnace, and at the same time, the influence of other gases can be minimized.

Namely, oxygen required for improvement in erasability of the stimulable phosphor can be introduced in the step of calcining the mixture of the phosphor materials by regulating the capacity of the calcining region of the furnace for 1 kg of the mixture of the phosphor materials to be calcined and the amount of oxygen introduced for 1 L of the capacity of the calcining region.

Further, by replacing gas within the furnace core tube with a gas containing a predetermined amount of oxygen, the amount of oxygen within the furnace core tube can be introduced so as to increase in stages or continuously.

A desired amount of oxygen is introduced by, for example, the following procedure.

First, immediately after the mixture of the phosphor materials has been placed in a calcining furnace whose temperature has reached the calcining temperature, evacuation is carried out for several minutes to remove air from the furnace core tube. At this time, although calcination can be carried out as long as the interior of the furnace core tube is in a near vacuum state, the degree of vacuum is desirably 0.1 torr or less, since the amount of oxygen existing in the atmosphere needs to be properly specified.

Subsequently, a predetermined amount of oxygen is supplied to the interior of the furnace core tube and charged to a desired atmospheric pressure. At this time, the amount of oxygen introduced is, as described above, preferably 0.1 to 200 ml per 1 L of the capacity of the calcining region of the furnace core tube. The amount of oxygen introduced is measured at the calcining temperature.

After the predetermined amount of oxygen has been properly introduced into the furnace core tube, the above-described neutral gas is further introduced into the furnace core tube and the pressure within the furnace is adjusted to be about 760 torr (1 atm.), that is, a pressure value in the vicinity of atmospheric pressure. Thereby, a weakly oxidizing atmosphere can be formed within the furnace.

When the atmosphere within the furnace core tube is adjusted to be a weakly oxidizing atmosphere, for example, an oxygen-containing gas such as air, or an oxygen-containing inert gas may be introduced into the furnace core tube in place of oxygen.

In general, it is preferable that the amount of the oxygen-containing gas such as air introduced, is an amount required in order for the amount of oxygen introduced to be equal to the amount it would be if only oxygen were introduced. However, the amount of an oxygen-containing gas introduced is more preferably in the range of 0.5 to 1000 ml per 1 L of the capacity of the calcining region in the furnace core tube, and most preferably in the range of 5 to 500 ml.

The introduction of oxygen into the furnace core tube is not necessarily carried out after the furnace core tube is evacuated so as to be in a vacuum state. For example, an extremely small amount of oxygen may merely be introduced into the furnace core tube under an atmospheric (1 atm.) neutral gas or a weakly oxidizing atmospheric (1 atm.) atmosphere. Alternatively, the introduction of oxygen may be carried out so that the amount of oxygen within the furnace core tube is increased due to gas which contains oxygen being introduced into the furnace.

A powdered phosphor can be obtained by carrying out the calcination in the above-described manner.

[Other Steps]

Examples of other steps include a cooling step which is carried out after the calcining step, and an annealing step which is carried out before the cooling step.

The annealing step may be carried out immediately after the calcining step. It is preferable, however, that annealing is carried out after a certain period of time in which removal and replacement of the atmosphere are carried out while a constant temperature is maintained.

In the annealing step, annealing is carried out in such a manner that the temperature is controlled so as to slowly decrease from a temperature at which the annealing is started to a predetermined temperature. In particular, since the emission characteristics of the stimulable phosphor are improved by annealing, annealing is preferably carried out while temperature is decreased at a rate of 0.2 to 5° C./minute until the temperature becomes 20 to 200° C. lower than the temperature at the time of the completion of the calcination.

In the cooling step, cooling may be carried out either by a method in which the calcined product is allowed to stand so that the temperature thereof decreases, or a method in which the temperature of the calcined product is controlled by a cooler and made to decrease. However, the latter method is preferable in terms of shortened cooling time and facilitation of stable preparation of a stimulable phosphor having sufficient characteristics.

Further, various steps such as a washing step, an aggregate dispersing and classifying step, a drying step, and the like can optionally be provided after the cooling step. Particularly, in the phosphor preparing method of the present invention, over-sintered particles are not formed. Therefore, even if the particles are subjected to the aggregate dispersing process and the classifying process, there is little decrease in the average particle diameter (Dm) of the obtained phosphor. Accordingly, in the phosphor preparing method of the present invention, the aggregate dispersing and classifying step can be favorably carried out.

The aggregate dispersing and classifying step is divided into an aggregate dispersing step and a classifying step.

The aggregate dispersing step is carried out by dispersing an aggregate in an appropriate dispersion medium. The aggregate dispersing process refers to a process in which the obtained phosphor particles are dispersed in a dispersion medium and stirred so that sintering and aggregation caused by the calcination are mitigated.

Examples of the dispersion medium include water, various alcohols, ethers, or mixtures thereof. A dispersion medium which imparts desired characteristics to a radiation image conversion panel to be obtained can be appropriately selected from these dispersion media. For example, when a high dispersing characteristic needs to be obtained, lower alcohol can be selected.

An example of a classifying method in the classifying step is a method in which the obtained phosphor particles are passed through a mesh or the like. The opening of the mesh is preferably 5 to 50 µm.

An example of washing in the washing step is washing with methanol. In the drying step, examples of drying are warm air drying, air drying, vacuum drying, or the like.

Phosphor

The rare earth activated, alkaline earth metal fluorohalide based phosphor obtained by the phosphor preparing method of the present invention has a high stimulated emission luminance since it has few over-sintered particles formed in the calcining step. Further, since few over-sintered particles are formed, in accordance with the phosphor preparing method of the present invention, a high yield of the phosphor can be obtained even if the aggregate dispersing and classifying step is carried out.

EXAMPLES

The present invention will be described in detail by Examples, but it is not limited to the following Examples.

Example 1

Mixing Step

Particles of phosphor material (BaFBr: Eu, the proportion of tetradecahedron-structured particles in the particles: 85% by weight), and particles of another phosphor material (BaFI Eu, the proportion of tetradecahedron-structured particles in the particles: 10% by weight) were prepared. (In the synthesis of the respective particles, $5 \times 10^{-3}$ mol % of Eu and $1 \times 10^{-3}$ mol % of K, Cs and Ca with respect to Ba were added to the respective particles.)

The average particle diameter (Dm) of the BaFBr particles was 3.3 µm, while the average particle diameter (Dm) of the BaFI particles was 7.5 µm (the average particle diameter (Dm) of the BaFI particles/the average particle diameter (Dm) of the BaFBr particles=2.27).

Both types of particles were mixed such that the compounding ratio of Br to I was 85:15. Subsequently, 1% by weight of alumina ultra-particles was added to the resulting mixture in order to prevent sintering at the time of calcination, and this mixture was sufficiently mixed by a mixer to obtain a mixture of the phosphor materials.

Preparing Device

In Examples, a preparing device (i.e., a calcining device) satisfying the following conditions was used.

Furnace core tube: a quartz furnace core tube having a diameter of 20 cm and a capacity of 70 liters Boat (a calcining container): a semicylindrical quartz boat having an opening at the top and having a capacity of 7 liters Calcining Step Three kilograms of the obtained mixture of the phosphor materials was loaded on the boat (calcining container). This boat was placed in the furnace core tube at a predetermined position thereof, and the furnace core tube was sealed with a cover which covers the opening through which samples are charged.

Subsequently, the mixture of the phosphor materials was calcined at 850° C. for 2 hours, while heated by a heat source, in an atmosphere which contains an extremely small amount of oxygen.

Cooling Step

After the calcining step, the interior of the calcining furnace was cooled, while evacuated, until the temperature lowered to room temperature, and a calcined product (particles) was thereby obtained. The average particle diameter (Dm) and the stimulated emission amount of the obtained calcined product (particles) were measured as in the following. Results are given in Table 1.

Measurement of Average Particle Diameter (Dm)

The average particle diameter (Dm) of the obtained particles was measured, as the volume average particle diameter, by a laser diffraction type particle size distribution measuring device (LA-500, manufactured by Horiba Seisakusho Co., Ltd.).

Measurement of Stimulated Emission Amount

The obtained particles were uniformly packed into a holder for evaluation having a thickness of 1 mm and an internal diameter of a cross section of 10 mm ψ. The surface of the phosphor was irradiated with 100 mR of an X-ray having tube voltage of 80 KVp, followed by irradiation with a semiconductor laser beam (whose wavelength is 660 nm) having an excitation energy of 4.3 J/m$^2$, and by excitation thereof. Subsequently, stimulated emission light radiated from the particles was received by a photomultiplier via an optical filter (B-410), and the stimulated emission amount was measured. The obtained values were converted into relative values and evaluated.

Aggregate-Dispersing and Classifying Step

The aggregate-dispersing and classifying step was carried out by adding 1.5 kg of methanol to the obtained calcined product (particles), stirring the resulting mixture for 3 hours, and then filtering the mixture through a nylon mesh having openings of 20 μm. The particles which passed through the mesh were subjected to solid-liquid separation by using a filter paper and to warm air drying to obtain a phosphor (i.e., phosphor particles). The average particle diameter (Dm) and the stimulated emission amount of the obtained phosphor (i.e., phosphor particles) were measured in the same way as that described before. Moreover, the yield after the aggregate-dispersing and classifying step was measured as in the following. Results are shown in Table 1.

Measurement of Yield after Aggregate-Dispersing and Classifying Step

The masses of the particles before and after the aggregate-dispersing and classifying step and drying were respectively measured. A mass ratio (i.e., the mass of the particles before the aggregate-dispersing and classifying step/the mass of the particles after the aggregate-dispersing and classifying step and drying) was represented as an yield (% by weight).

Example 2

A phosphor (i.e., phosphor particles) was obtained and measurements were carried out in the same way as in Example 1 except that the BaFBr particles (wherein the average particle diameter (Dm) was 3.3 μm and the proportion of tetradecahedron-structured particles in the particles was 85% by weight) were replaced with BaFBr particles (wherein the average particle diameter (Dm) was 2.4 μm and the proportion of tetradecahedron-structured particles in the particles was 80% by weight). (The average particle diameter (Dm) of the BaFI particles/the average particle diameter (Dm) of the BaFBr particles=3.13.) Results are shown in Table 1.

Example 3

A phosphor (i.e., phosphor particles) was obtained and measurements were carried out in the same way as in Example 1 except that the BaFBr particles (wherein the average particle diameter (Dm) was 3.3 μm and the proportion of tetradecahedron-structured particles in the particles was 85% by weight) and the BaFI particles (wherein the average particle diameter (Dm) was 7.5 μm and the proportion of tetradecahedron-structured particles in the particles was 10% by weight) were replaced with BaFBr particles (wherein the average particle diameter (Dm) was 1.8 μm and the proportion of tetradecahedron-structured particles in the particles was 78% by weight) and BaFI particles (wherein the average particle diameter (Dm) was 4.1 μm and the proportion of tetradecahedron-structured particles in the particles was 20% by weight). (The average particle diameter (Dm) of the BaFI particles/the average particle diameter (Dm) of the BaFBr particles=2.28.) Results are shown in Table 1.

Example 4

A phosphor (i.e., phosphor particles) was obtained and measurements were carried out in the same way as in Example 1 except that the BaFBr particles (wherein the average particle diameter (Dm) was 3.3 μm and the proportion of tetradecahedron-structured particles in the particles was 85% by weight) and the BaFI particles (wherein the average particle diameter (Dm) was 7.5 μm and the proportion of tetradecahedron-structured particles in the particles was 10% by weight) were replaced with BaFBr particles (wherein the average particle diameter (Dm) was 1.8 μm and the proportion of tetradecahedron-structured particles in the particles was 78% by weight) and BaFI particles (wherein the average particle diameter (Dm) was 2.2 μm and the proportion of tetradecahedron-structured particles in the particles was 25% by weight). (The average particle diameter (Dm) of the BaFI particles/the average particle diameter (Dm) of the BaFBr particles=1.22.) Results are shown in Table 1.

Comparative Example 1

A phosphor (i.e., phosphor particles) was obtained and measurements were carried out in the same way as in Example 1 except that the BaFBr particles (wherein the average particle diameter (Dm) was 3.3 μm and the proportion of tetradecahedron-structured particles in the particles was 85% by weight) were replaced with BaFBr particles (wherein the average particle diameter (Dm) was 1.8 μm and the proportion of tetradecahedron-structured particles in the particles was 78% by weight). (The average particle diameter (Dm) of the BaFI particles/the average particle diameter (Dm) of the BaFBr particles=4.17.) Results are shown in Table 1.

TABLE 1

|  | Dm(BaFI)/Dm(BaFBr) | Average particle diameter before aggregate-dispersing and classifying step (Dm (μm)) | Average particle diameter after aggregate-dispersing and classifying step (Dm (μm)) | Stimulated emission amount before aggregate-dispersing and classifying step (a.u.) | Stimulated emission amount after aggregate-dispersing and classifying step (a.u.) | Yield (%) |
|---|---|---|---|---|---|---|
| Example 1 | 2.27 | 4.5 | 4.2 | 64 | 62 | 95 |
| Example 2 | 3.13 | 3.9 | 2.9 | 60 | 55 | 89 |

TABLE 1-continued

|  | Dm(BaFl)/ Dm(BaFBr) | Average particle diameter before aggregate- dispersing and classifying step (Dm (μm)) | Average particle diameter after aggregate- dispersing and classifying step (Dm (μm)) | Stimulated emission amount before aggregate- dispersing and classifying step (a.u.) | Stimulated emission amount after aggregate- dispersing and classifying step (a.u.) | Yield (%) |
|---|---|---|---|---|---|---|
| Example 3 | 2.28 | 3.6 | 3.0 | 58 | 52 | 81 |
| Example 4 | 1.22 | 3.0 | 2.3 | 56 | 51 | 82 |
| Comparative Example 1 | 4.17 | 4.1 | 1.7 | 41 | 26 | 60 |

As described above, in accordance with the present invention, there can be provided a method of preparing a rare earth activated, alkaline earth metal fluorohalide based phosphor. This method results in a high yield of a rare earth activated, alkaline earth metal fluorohalide based phosphor having a high stimulated emission luminance.

What is claimed is:

1. A method of preparing a rare earth activated, alkaline earth metal fluorohalide based phosphor, comprising the steps of:
   (a) providing a phosphor material, which includes BaFBr particles, and a phosphor material, which includes BaFI particles, wherein the average particle diameter of the BaFI particles is no more than four times the average particle diameter of the BaFBr particles;
   (b) mixing the phosphor materials together to thereby obtain a mixture of the phosphor materials; and
   (c) calcining the mixture of phosphor materials.

2. The method of claim 1, further comprising, subsequent to said step of calcining, a step of dispersing an aggregate and classifying.

3. The method of claim 1, wherein, in said step of mixing the phosphor materials, the mole ratio of the particles of BaFBr phosphor material to the particles of BaFI phosphor material is 50/50 to 95/5.

4. The method of claim 1, wherein the particles of BaFBr have an average particle diameter from 0.1 to 10 μm.

5. The method of claim 1, wherein the step of providing includes providing particles of BaFBr wherein at least 70% by weight, and at most 50% by weight of the particles of BaFI, comprise crystals that each have a tetradecahedral structure.

6. The method of claim 1, wherein in the step of providing, the BaFI particles have an average particle diameter no more than two times the average particle diameter of the BaFBr particles.

7. The method of claim 1, wherein the average particle diameter of the particles of BaFBr phosphor material is 1 to 8 μm.

8. The method of claim 1, wherein the step of providing includes providing particles of BaFBr wherein at least 80% by weight, comprises crystals that each have a tetradecahedral structure.

9. The method of claim 1, wherein the step of providing includes providing particles of BaFI wherein at least 40% by weight, comprises crystals that each have a tetradecahedral structure.

10. The method of claim 1, further comprising the steps of:
   (a) providing at least one of an activator, an additive containing an alkaline earth metal element, and an additive containing an alkali metal element; and
   (b) mixing the additive with at least one of the particles of BaFBr and BaFI either before or during the step of mixing the phosphor materials together.

11. The method of claim 10, wherein the additive is a halide.

12. The method of claim 10, wherein the step of mixing includes providing a mole ratio of the activator to the particles of BaFI and BaFBr from 0/10 to 2/10.

13. The method of claim 10, wherein the step of:mixing includes providing a mole ratio of the activator containing an alkaline earth metal element to the particles of BaFI and BaFBr from 0/10 to 5/10.

14. The method of claim 10, wherein the step of mixing includes providing a mole ratio of the activator containing an alkali metal element to the particles of BaFI and BaFBr from 0/10 to 0.5/10.

15. The method of claim 1, wherein said step of mixing is performed by at least one of:
   (i) a process consisting essentially of measuring and mixing the phosphor materials;
   (ii) mixing the phosphor materials and thereafter heating to a temperature of 100° C. or more for a plurality of hours; and
   (iii) mixing the phosphor materials in a state of suspension.

16. The method of claim 1, wherein the step of calcining is performed at a temperature from 600 to 1000 degrees C.

17. The method of claim 1, wherein, in said step of calcining, the atmosphere within a furnace core tube is one of a neutral gas atmosphere and a slightly oxidizing gas atmosphere.

18. The method of claim 17, wherein the slightly oxidizing gas atmosphere contains 100 to 100000 ppm of oxygen per unit volume of neutral gas.

19. The method of claim 1, further comprising after the step of calcining, at least one of a step of cooling, a step of annealing, a step of washing, and a step of drying.

20. The method of claim 19, wherein the step of annealing is one of a step which is carried out immediately after said step of calcining and which is carried out after a certain period of time in which removal and replacement of the atmosphere are carried out while a constant temperature is maintained.

21. The method of claim 15, wherein said plurality of hours is several hours.

* * * * *